(12) United States Patent
Slott et al.

(10) Patent No.: US 8,024,370 B2
(45) Date of Patent: Sep. 20, 2011

(54) METHOD AND SYSTEM FOR DEFINING A PSEUDO-WORLD

(75) Inventors: Jordan Matthew Slott, Burlington, MA (US); Paul Vincent Byrne, Los Altos, CA (US); Jonathan H. Kaplan, San Francisco, CA (US); Nigel David Simpson, Bainbridge Island, WA (US); Deron D. Johnson, Menlo Park, CA (US)

(73) Assignee: Oracle America, Inc., Redwood City, CA (US)

( * ) Notice: Subject to any disclaimer, the term of this patent is extended or adjusted under 35 U.S.C. 154(b) by 483 days.

(21) Appl. No.: 12/181,167

(22) Filed: Jul. 28, 2008

(65) Prior Publication Data

US 2010/0023548 A1 Jan. 28, 2010

(51) Int. Cl.
*G06F 7/00* (2006.01)
*G06F 17/30* (2006.01)
(52) U.S. Cl. ...................................... 707/802
(58) Field of Classification Search ................ None
See application file for complete search history.

(56) References Cited

U.S. PATENT DOCUMENTS

| | | | | |
|---|---|---|---|---|
| 2001/0055039 | A1* | 12/2001 | Matsuda | 345/848 |
| 2006/0221081 | A1* | 10/2006 | Cohen et al. | 345/473 |
| 2007/0179991 | A1* | 8/2007 | Burnett et al. | 707/201 |
| 2009/0150778 | A1* | 6/2009 | Nicol, II | 715/706 |

OTHER PUBLICATIONS

Programming Croquet—Croquet Consortium, A Croquet Object, http://www.opencroquet.org/index.php/Programming_Croquet, Sep. 27, 2006, 7 pages.

* cited by examiner

*Primary Examiner* — Wilson Lee
*Assistant Examiner* — Belinda Xue
(74) *Attorney, Agent, or Firm* — Osha • Liang LLP

(57) ABSTRACT

A method for creating a pseudo-world that includes identifying a first pseudo-world file system, wherein the first pseudo-world file system includes a plurality of folders and a plurality of attribute files in a file system hierarchy, wherein the file system hierarchy defines a plurality of parent child relationships between the plurality of folders and the plurality of attribute files, and processing each of the plurality of folders according to the file system hierarchy. Processing a folder of the plurality of folders includes identifying at least one child attribute file of the plurality of attribute files comprised in the folder, wherein the folder and the at least one child attribute file are in a parent child relationship of the plurality of parent child relationships based on the at least one child attribute file comprised in the folder, identifying a parent cell in the pseudo-world, wherein the parent cell is defined by a parent attribute file corresponding to the folder, and generating, in the pseudo-world, a child cell within the parent cell for each of the at least one child attribute files based on the parent child relationship. The method may further include displaying the pseudo-world.

16 Claims, 9 Drawing Sheets

METHOD AND SYSTEM FOR DEFINING A PSEUDO-WORLD

BACKGROUND

Computer systems include functionality to execute many different applications. One particular type of application is a pseudo-world application. A pseudo-world application presents a pseudo-world to a user. In a general sense, a pseudo-world is a simulated environment that may have certain characteristics of the real world. Specifically, while the real world has various physical things, such as physical inanimate objects, beings that live and die (e.g., plants, animals, people), and environmental conditions that cannot entirely be controlled, the pseudo-world provides a controlled simulation of the real world.

A creator of a pseudo-world may seek to replicate the interaction that an individual has with the real world. For example, rather than a user moving an item in a two dimensional (2D) space, a pseudo-world allows the user to interact in a three dimensional (3D) space. A user may scroll right and left, up and down, and in and out, or a combination thereof in the pseudo-world. Moreover, a pseudo-world may include imitations of different physical things common to the real world. For example, the pseudo-world may have graphical 3D images that appear as trees, animals, buildings, rooms, and other such things common to the real world. The pseudo-world may also have imitations of people-type beings called avatars. An avatar is a manifestation of a living being in the pseudo-world. At least a portion of the avatars in the pseudo-world may represent users. The avatar may or may not have the likeness of the user and may or may not even appear human. Through avatars, users may communicate with each other and the data on the computer. For example, one user's avatar may move to the region in which another user's avatar is located in the pseudo-world. Each user may control his or her avatar's communication with the other avatar in the pseudo-world. Thus, through the avatars, the users communicate with each other.

Different techniques are used to create pseudo-worlds. In one technique, the objects in the pseudo-world are managed in a database. Specifically, each record in a database table may correspond to an object in the pseudo-world. Specifically, a record defines the properties of an object. The records may include references to other records to define associations between objects.

Another technique is to have the entire pseudo-world including all objects in programming language instructions. The code must be modified to change the pseudo-world. Portions of the code corresponding to the objects in the pseudo-world may be commented out to remove the objects. In particular, comment indicators are added so that the portion corresponding to the removed objects is not executed.

SUMMARY

In general, in one aspect, the invention relates to a method for creating a pseudo-world that includes identifying a first pseudo-world file system, wherein the first pseudo-world file system includes a plurality of folders and a plurality of attribute files in a file system hierarchy, wherein the file system hierarchy defines a plurality of parent child relationships between the plurality of folders and the plurality of attribute files, and processing each of the plurality of folders according to the file system hierarchy. Processing a folder of the plurality of folders includes identifying at least one child attribute file of the plurality of attribute files comprised in the folder, wherein the folder and the at least one child attribute file are in a parent child relationship of the plurality of parent child relationships based on the at least one child attribute file comprised in the folder, identifying a parent cell in the pseudo-world, wherein the parent cell is defined by a parent attribute file corresponding to the folder, and generating, in the pseudo-world, a child cell within the parent cell for each of the at least one child attribute files based on the parent child relationship. The method may further include displaying the pseudo-world.

In general, in one aspect, the invention relates to a method for designing a pseudo-world, that includes identifying a plurality of cells in the pseudo-world, and processing each cell of the plurality of cells. Processing a cell of the plurality of cells includes identifying a parent child relationship between the cell and a parent cell, wherein the parent child relationship is based on the parent cell that includes the cell in the pseudo-world, generating an attribute file for the cell, identifying a parent folder in a first pseudo-world file system, wherein the parent cell is defined by a parent attribute file corresponding to the parent folder, and storing the attribute file in the parent folder in the first pseudo-world file system. The method may further include storing the pseudo-world file system on a physical storage device.

In general, in one aspect, the invention relates to a computer system for creating a pseudo-world the computer system that includes a processor, and a physical storage device for storing a first pseudo-world file system, wherein the first pseudo-world file system includes a plurality of folders and a plurality of attribute files in a file system hierarchy, wherein the file system hierarchy defines a plurality of parent child relationships between the plurality of folders and the plurality of attribute files. The computer system may further include software instructions for causing the processor to perform the steps of processing each of the plurality of folders according to the file system hierarchy to generate the pseudo-world. Processing a folder of the plurality of folders includes identifying at least one child attribute file of the plurality of attribute files comprised in the folder, wherein the folder and the at least one child attribute file are in a parent child relationship of the plurality of parent child relationships based on the at least one child attribute file comprised in the folder, identifying a parent cell in the pseudo-world, wherein the parent cell is defined by a parent attribute file corresponding to the folder, and generating, in the pseudo-world, a child cell within the parent cell for each of the at least one child attribute files based on the parent child relationship.

Other aspects of the invention will be apparent from the following description and the appended claims.

DETAILED DESCRIPTION

Figure 1:
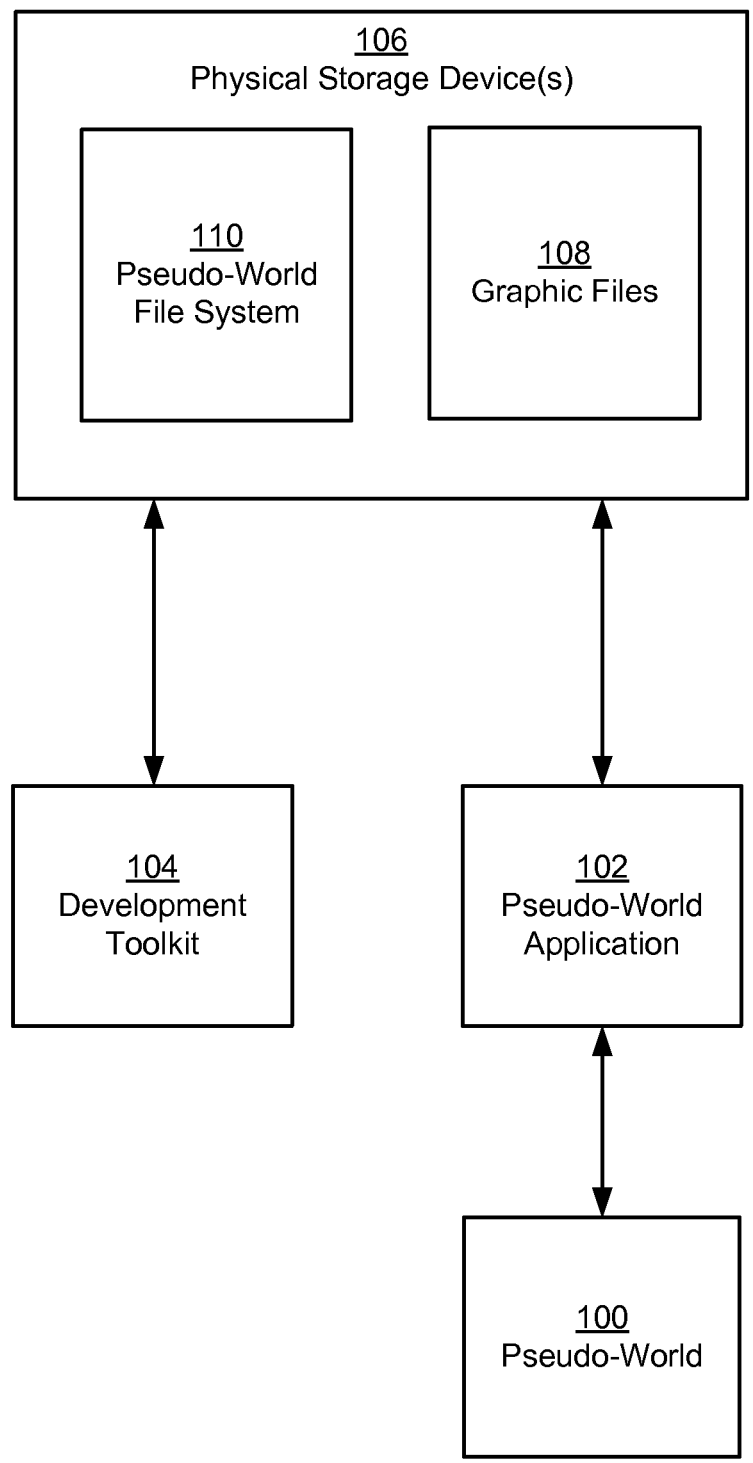
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for creating a pseudo-world. In one or more embodiments of the invention, the objects in the pseudo-world are in the form of cells. Within the boundaries of a cell may be one or more other cells. For example, a room cell (i.e., a cell that graphically shows a room) may include a chair cell within the room cell's boundaries. The inclusion of a cell within the boundaries of another cell may create a parent child relationship between the cells. Specifically, a cell that is included in the boundaries of another cell is the child cell. The cell that has the child cell in its boundaries is the parent cell. In one or more embodiments of the invention, the parent child relationship between cells is configurable. For example, consider the scenario in which cell A is located in the boundaries of cell B, which is located within the boundaries of cell C. Cell A may be a child cell of only cell C rather than a child cell of cell B. Namely, cell A may be configured to not be a child of cell B, but rather a child of cell C in the example. The configurability allows for versatility in being able to handle different types of cells and pseudo-worlds.

Embodiments of the invention represent the parent-child relationships between cells using a file system hierarchy. Specifically, the file system hierarchy of the pseudo-world file system represents how cells are included in the boundaries of other cells in the pseudo-world. In the pseudo-world file system, the attributes of each cell are defined by an attribute file. When a parent cell includes one or more child cells, the parent cell also has a corresponding a directory in the pseudo-world file system. The corresponding directory stores the attribute files corresponding to each of the child cells of the parent cell. Thus, the pseudo-world may be modified by manipulating the pseudo-world file system.

FIG. 1 shows a schematic diagram of a system in accordance with one or more embodiments of the invention. As shown in FIG. 1, amongst other possible components, the system includes a pseudo-world (100), a pseudo-world application (102), a development toolkit (104), and one or more physical storage devices (106). Each of the components is discussed below.

A pseudo-world (100) is a simulated environment that may have certain characteristics of the real world. The pseudo-world (100) provides a controlled simulation of the real world. Thus, a user may similarly interact with pseudo-world (100) as with the real world. For example, a user may transverse the pseudo-world (100) in three dimensions (3D). In one or more embodiments of the invention, the pseudo-world is composed of cells. A cell is the basic building block in the pseudo-world (100). A cell may represent inanimate and animate objects. For example, a cell may be an imitation of a physical thing existing to the real world. For example, the cell may represent a tree, an animal, a building, a room, a wall, a person, a conference phone, a phone booth, a radio, and other such things common to the real world.

One type of cell is an avatar. An avatar is a manifestation of a living being in the pseudo-world. An avatar may represent a user. The avatar may or may not have the likeness of the user and may or may not even appear human. Through avatars, users may communicate with each other and with the pseudo-world.

Cells may also be used to represent things not present in the real world. For example, a cell may be a presentation of a document, such as a word processing document, a slide show presentation, a video of the real world, or any other such type of computer-generated document. In another example, a cell may be an embedded application, such as a music player, an email application, a word processing application, or other such application. For example, a cell may be a 3D music player that allows an avatar to play different types of music. Further, the cell may represent a monster, unicorn, or other mythical being. The different types of cells discussed above are for example purposes only. Other types of cells may be included without departing from the scope of the invention.

The number of components of the cell may be defined by a developer in accordance with one or more embodiments of the invention. A developer, as used herein, includes any individual or entity, that creates, modifies, or deletes a pseudo-world. For example, a developer defines whether an entire room including walls is a cell or whether each wall of the room is a separate cell. In another example, the developer defines whether an avatar with a hat is a single cell or whether the hat is a separate cell from the avatar. The components of the cell are manipulated together. Thus, when a developer defines the cell, the developer may account for the degree of independence desired for the portion of the pseudo-world represented by the cell.

In one or more embodiments of the invention, a pseudo-world (100) may have different uses which define the appearance of the pseudo-world. For example, a pseudo-world (100) may be a virtual meeting place for a company. In such an example, the pseudo-world (100) may provide meeting rooms, offices, and common areas where different avatars may converse. The meeting rooms may have video images of the real world to allow for an avatar controlled by a remote user to communicate with individuals in the real world. The meeting rooms may also have virtual telephones that may be used to call a real telephone in the real world. The walls may be used to project documents, execute embedded applications, and interact with the real world.

In another example, the pseudo-world (100) may represent a classroom or a university. In such an example, the pseudo-world (100) may have similar features as a classroom in the real world, such as table, chairs, and desks. An avatar in the classroom pseudo-world (100) may be able to raise its "hand" to ask questions and manipulate presentations. Similar to the company, the pseudo-world may also have different ways for an avatar to communicate with the real world, such as video conferencing and a virtual telephone.

In another example, the pseudo-world (100) may be a next generation Internet. Specifically, avatars in the internet pseudo-world may access company's websites. For example, a company selling goods may have a website in the pseudo-world that gives the user the sense of being in the company's physical retail store. In such an example, the avatar controlled by the user may go through different virtual isles of virtual shelves that display goods. Similarly, an avatar controlled by a user may visit different departments of the company's website to view 3D graphical images of goods in each department.

Similar to the current Internet, the next generation Internet may have searching capabilities and advertising capabilities.

In another example, the pseudo-world (100) may be a gaming world. In such an example, the pseudo-world (100) may have representations of lakes, streams, space, stars, space ships, monsters, avatars representing humanoids, and other such objects of imagination. Users, through their avatars, may interact with the gaming pseudo-world to earn points and get to higher levels in the game.

The above-listed examples are only a few representative examples of the different types of pseudo-worlds. Other types of pseudo-worlds may exist without departing from the scope of the invention. Also, in one or more embodiments of the invention, multiple pseudo-worlds may simultaneously exist. For example, each organization or department of an organization may include a separate pseudo-world.

Continuing with FIG. 1, in one or more embodiments of the invention, a pseudo-world application (102) includes functionality to generate a pseudo-world from the physical storage devices (106) (discussed below) and interact with one or more users of the pseudo-world (100). The pseudo-world application (102) may also include functionality to modify the pseudo-world file system (110) (discussed below) based on the interactions between the user and the pseudo-world (100). For example, if a user, through the user's avatar, moves a chair from one room to the next in the pseudo-world (100), the pseudo-world application (102), may include functionality to update the pseudo-world file system (110) based on the change of the chair's position in the pseudo-world (100).

In one or more embodiments of the invention, the pseudo-world application (102) may use a client-server architecture. Specifically, a client portion of the pseudo-world application (102) may execute on one or more users' computing devices while another portion executes on one or more servers (not shown). In alternative embodiments of the invention, the entirety of the pseudo-world application (102) may execute on the user's computer system or the server. For example, a user may access the pseudo-world application (102) using an internet browser or other such application.

In one or more embodiments of the invention, the system includes a development toolkit (104). A development toolkit (104) includes functionality to assist a developer in creating the pseudo-world (100). For example, the development toolkit (104) may include functionality to allow a developer to graphically create cells in the pseudo-world (100), such as by using a graphical user interface. Based on the graphical creation of the cells, the development toolkit (104) may include functionality to add files and folders to the pseudo-world file system (110) (discussed below).

In one or more embodiments of the invention, the development toolkit (104) and the pseudo-world application (102) are operatively connected to physical storage devices (106). In one or more embodiments of the invention, the physical storage device (106) is any type of physical device for storing data, such as a data server, disk, flash memory, or any other type of storage unit. Further, the physical storage device (106) may include multiple different devices. The multiple different devices may or may not be of the same type or located at the same physical site. For example, a portion of the physical storage device (106) may be located on the user's computing device while another portion is distributed across the Internet. In the example, the graphic files (108) (discussed below) and a pseudo-world file system (110) (discussed below) may be stored on separate physical storage devices.

The physical storage device (106) includes functionality to store graphic files (108) and a pseudo-world file system (110). In one or more embodiments of the invention, the graphic files (108) define the physical appearance of the cells in the pseudo-world (100). In particular, each cell in the pseudo-world (100) has one or more graphic files (108) that describe the 3D image of the cell. In one or more embodiments of the invention, the graphic files (108) do not define the relationships between the cells in the pseudo-world.

In one or more embodiments of the invention, the pseudo-world file system (110) maintains information about the relationships between cells in the pseudo-world. Specifically, each cell in the pseudo-world has an attribute file (discussed below in relation to FIG. 3) in the pseudo-world file system (110) in accordance with one or more embodiments of the invention. Cells in the pseudo-world also have a corresponding folder (discussed below in relation to FIG. 3) in the pseudo-world file system. The position of the attribute file in the pseudo-world file system (110) defines the position of the cell corresponding to the attribute file in the pseudo-world (100). For example, when an attribute file for cell A exists in a folder for cell B, cell A is in the boundaries of cell B in the pseudo-world. Thus, the relationships between the files and folders in the pseudo-world file system (110) define the relationships between the cells in the pseudo-world (100).

Figure 2:
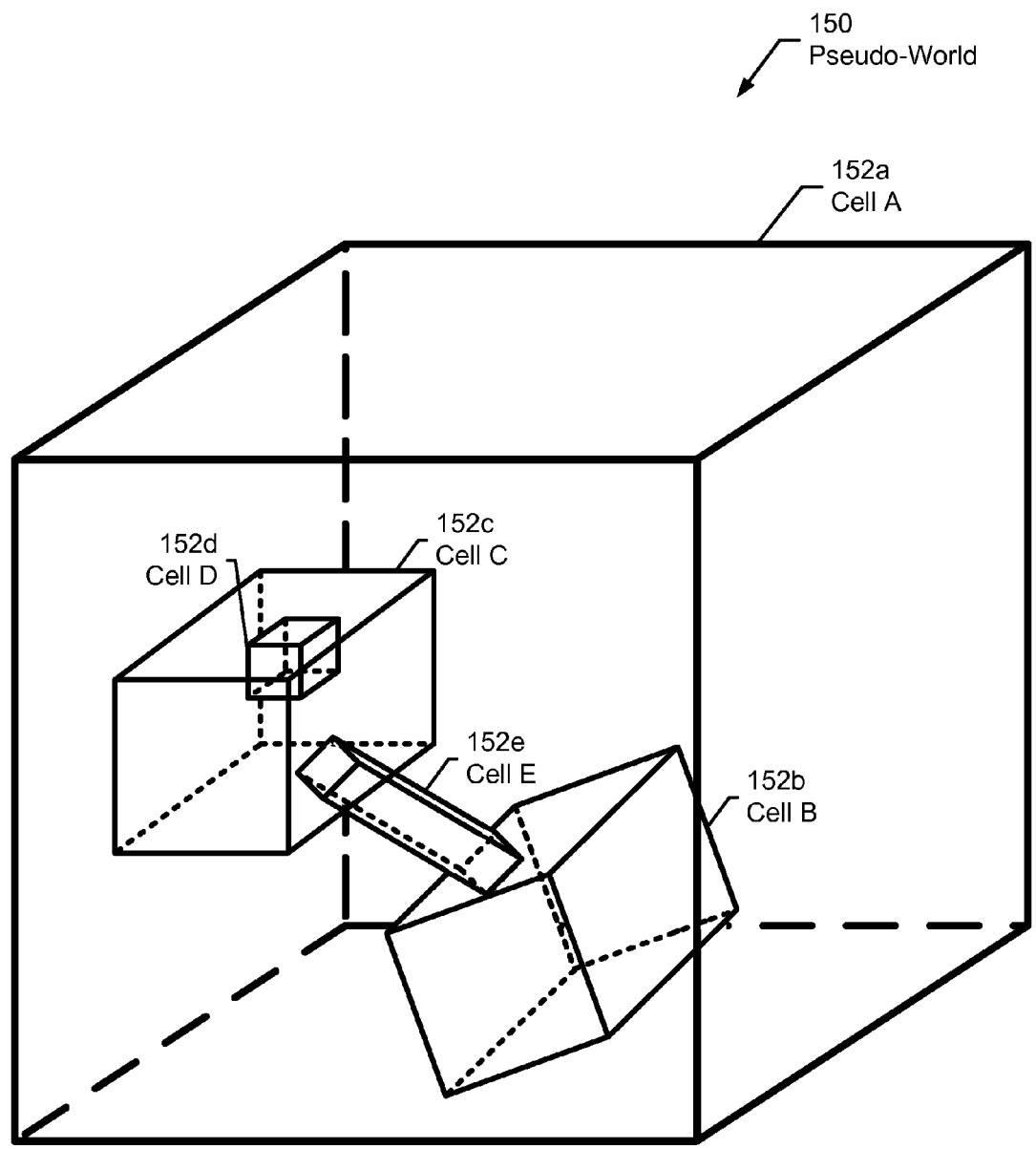
FIG. 2 shows a schematic diagram of an example pseudo-world in accordance with one or more embodiments of the invention.

FIG. 2 shows a schematic diagram of an example pseudo-world (150) in accordance with one or more embodiments of the invention. As shown in FIG. 2, the pseudo-world (150) includes multiple cells (152). The different types of cells (152) are discussed above in relation to FIG. 1. Although FIG. 2 shows each cell (152) as a box, a cell (152) may be any shape or size and is not limited to the box shapes shown in FIG. 2. Further, in one or more embodiments of the invention, cells (152) may change shapes and sizes.

As shown in FIG. 2, cells (152) typically exist within the boundaries of other cells. The outermost cell (e.g., Cell A (152a) in FIG. 2) defines the boundaries of the pseudo-world (150) in accordance with one or more embodiments of the invention. Thus, each cell that is not the outermost cell is completely within the boundaries of another cell. In the example shown in FIG. 2, Cell B (152b), Cell C (152c), Cell D (152d), and Cell E (152e) are within the boundaries of Cell A (152a). Thus, Cell B (152b), Cell C (152c), Cell D (152d), and Cell E (152e), are child cells of Cell A (152a), a parent cell. Similarly, because Cell D (152d) is in the boundaries of Cell C (152c), Cell D (152d) is a child cell of Cell C (152c). Therefore, Cell C (152c) is both a child cell of Cell A (152a) and, simultaneously, a parent cell of Cell D (152d).

In one or more embodiments of the invention, a cell (152) may also cross the boundaries of one or more cells (152). In one or more embodiments of the invention, the parent child relationship between cells may require that the child cell exists completely within the boundaries of the parent cell. In such embodiments, for the example shown in FIG. 2, the parent cell of Cell E (152e) may be only Cell A (152a).

In one or more embodiments of the invention, each cell (152) has an origin. The origin of the cell is a point in the pseudo-world (150) from which points related to the cell (152) are derived. For example, a straight boundary line of the cell may be defined by a starting point and an ending point. Both the starting point and the ending point may be defined by a direction and distance from the origin of the cell.

In one or more embodiments of the invention, the positions of cells are in accordance with a local coordinate system. In the local coordinate system, origin of the cell (152) is defined with respect to its parent cell. Specifically, the origin of the cell (152) is defined in relation to the origin of the cell's parent. For example, the origin of Cell D (152d) may be defined in terms of direction and distance from the origin of Cell C (152c). Thus, if the parent cell moves, the child cells of the parent cell automatically move with the parent.

In alternative embodiments of the invention, the positions of the cells are in accordance with a global coordinate system. In such embodiments, the origin of the cell (152) is defined in terms of a global origin common to all cells. Thus, when global coordinate systems are used, the child cell remains in the same position even when the parent cell moves. Namely, the origin of the child cell must be updated for the child cell to change positions.

In one or more embodiments of the invention, attributes of a parent cell may be inherited by the child cells. For example, as discussed above, when the parent cell moves, the child cells of the parent cell also move. Similarly, in one or more embodiments of the invention, when the parent cell rotates or is rescaled, the child cells of the parent cell may also rotate or be rescaled. As another example, when the access permissions of a parent cell changes (e.g., in an access control list), the access permissions of the child cells may also change. Attributes of a child may be automatically adjusted when the child cell from one parent cell to another parent cell.

Figure 3:
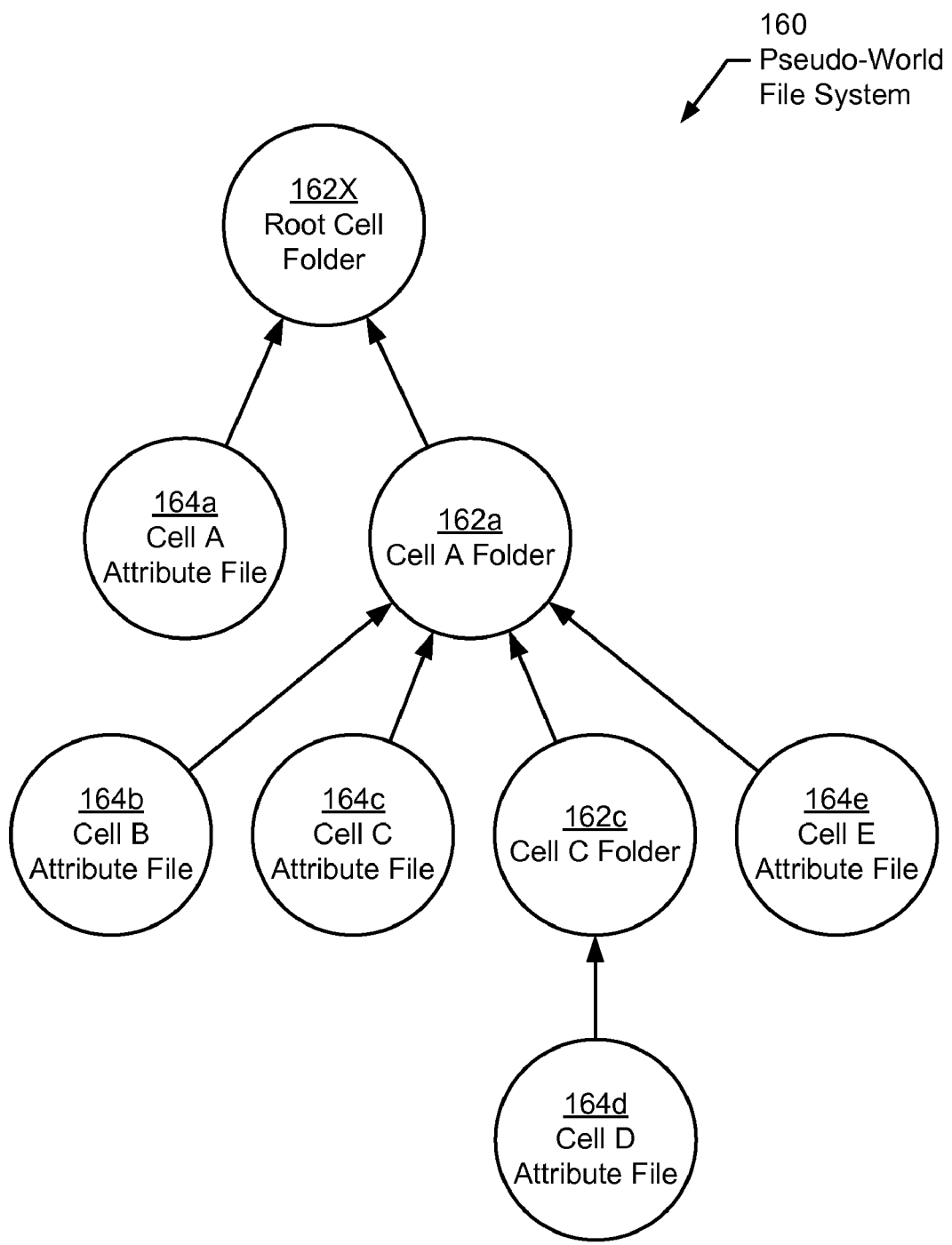
FIG. 3 shows a schematic diagram of an example file system in accordance with one or more embodiments of the invention.

FIG. 3 shows a schematic diagram of an example pseudo-world file system (160) in accordance with one or more embodiments of the invention. A pseudo-world file system (160) includes attribute files (164) and folders (162). Specifically, each cell in the pseudo-world has a corresponding attribute file (164). The attribute file (164) defines attributes of the cell in the pseudo-world. For example, the attribute file (164) may include information about the position of the origin, a reference to the graphic file for the cell, how big the cell is with respect to the pseudo-world, a reference to information about the functionality of the cell in the pseudo-world, or other such information that may be useful in defining a cell. Different file formats may be used for the attribute file (164). For example, the attribute file may be an extensible markup language (XML) file, a comma or tab delimited file, or any other possible format that may be used to distinguish between the different attributes of the cell.

In one or more embodiments of the invention, an attribute file may be a reference file. A reference file references another attribute file or folder. For example, the reference file may define the location of another attribute file or folder in the same pseudo-world file system or in a different pseudo-world file system. Using a reference file, a developer may easily create multiple pseudo-worlds with identical features.

In one or more embodiments of the invention, rather than referencing a graphics file, the attribute file may include the graphics for the cell. Specifically, the graphics may be defined in the attribute file. In such scenario, a separate graphics file, such as the graphics files (108) shown in FIG. 1, may not exist.

As shown in FIG. 3, the pseudo-world file system (160) is arranged in a file system hierarchy. The file system hierarchy of the pseudo-world file system (160) defines parent child relationships between the attribute files (164) and the folders. Each attribute file (164) or folder (162) is included in another folder. The attribute file or folder that is included in another folder is a child attribute file or folder. Conversely, a folder that includes attribute files or files is a parent folder. For example, Cell B attribute file (164b) is child attribute file of Cell A folder (162a). Cell C folder (162c) is a child folder of Cell A folder (162a). Likewise, Cell D attribute file (164d) is a child of Cell C folder (162c).

As shown in FIG. 3, the pseudo-world file system (160) may include a root cell folder (162X). The root cell folder (162X) corresponds to the cell in the pseudo-world (i.e., pseudo-world cell) that represents the entire pseudo-world. Since all cells are in the pseudo-world, all cells are in the root cell folder (162X). Attributes of the pseudo-world cell may be explicitly or implicitly defined. For example, the origin of the pseudo-world cell may be automatically set to (0,0,0) and the boundary of the pseudo-world cell may be automatically set as unlimited. Alternatively, the root cell folder (162X) may be associated with an attribute file (not shown) which explicitly defines the attributes of the pseudo-world.

The parent child relationships between the child attribute files and folders and the parent folder defines the parent child relationships between the cells in the pseudo-world. Specifically, as shown in FIG. 3, each cell that is a parent cell has both an attribute file and a folder. The folder for the parent cell stores attribute files corresponding to child cells of the parent cell. For example, in FIG. 2, Cell D is a child cell of parent Cell C. In FIG. 3, the parent-child relationship between Cell D and Cell C is captured by the Cell C folder (i.e., the folder corresponding to Cell C) containing the Cell D attribute file (164d) (i.e., the attribute file corresponding to Cell D).

In one or more embodiments of the invention, some attributes of the child cell are either explicitly or implicitly identifiable from the attribute file of the parent cell. For example, an attribute file for a child cell may define attributes, such as origin, bounds, rotation, scaling, and other such attributes, in relation to the attributes of the parent cell as defined by the attribute file for the parent cell. As another example, certain attributes of the parent cell may be automatically applied to the child cell. For example, attributes in the attribute file regarding the access permissions for the parent cell may be automatically applied to all child cells of the parent cell. Thus, moving an attribute file from one parent cell to another parent cell may cause automatically the change in at least a portion of attributes of the child cell.

In one or more embodiments of the invention, the folders for each cell are siblings of the attribute files corresponding to the cell. For example, the Cell C attribute file (164c) and Cell C folder (162c) are both in the Cell A folder (162a).

In alternative embodiments of the invention, each cell in the pseudo-world may have a corresponding folder that stores the attribute file for the cell and child attribute files of the cell. In such alternative embodiments, while not shown in FIG. 3, Cell C attribute file (164c) may be in Cell C folder (162c).

In one or more embodiments of the invention, attribute files (164) and folders (162) follow a naming convention. By following the naming convention, a file or folder is denoted as an attribute file (164) or a folder (162) for the pseudo-world. In one or more embodiments of the invention, cells may be hidden from the pseudo-world by changing the name of the attribute file (164) and/or the folder for the cell such that the attribute file (164) and/or folder (162) no longer follow the naming convention. In one or more embodiments of the invention, when a cell is hidden, child cells of the cell are also hidden. By changing the name back to a name that follows the naming convention, a cell may reappear in the pseudo-world.

Although FIG. 3 shows Cell D attribute file (164d) as a child of Cell C folder (162c), Cell D attribute file (164d) may also be set as a direct child of Cell A folder (162a). Specifically, because Cell D is not only a child of Cell C, but also a child of Cell A, it may be advantageous for Cell D attribute file (164d) to be directly in the Cell A folder. Thus, in one or more embodiments of the invention, the structure of the pseudo-world file system is customizable. The customizability of the pseudo-world file system (160) allows a developer to account for the type of cell that is in the pseudo-world. For example, as discussed above, when an attribute file is a child of a folder corresponding to a parent cell, then the parent cell and the child cell corresponding to the attribute file may be manipulated together (e.g., may be moved, copied, have the same access permissions, and other such manipulations).

In certain scenarios, being able to manipulate cells easily together is desired. For example, furniture in a room will typically stay in the room and should be manipulated with the room. In the example, when the room is copied, it is often desirable to copy all of the furniture of the room with a single command. In other scenarios, being able to manipulate cells together is not desirable. For example, even though a robot (e.g., a cell representing a self-moving device in the pseudo-world) may be within the boundaries of a room, the robot should be separate from the room. Specifically, in the example, the robot can easily change rooms, should not be copied when the room is copied, and is generally thought of as a separate entity from the room. Thus, in the example, it may be more advantageous for attribute file corresponding to the robot to be a child of only the root cell's folder. The ability to define the structure of the pseudo-world file system allows a developer to account for how the different types of cells are used in the pseudo-world.

In one or more embodiments of the invention, the pseudo-world file system creates a unique namespace. Specifically, the pathnames to an attribute file of a cell may be a unique identifier for the cell. For example, the unique identifier for Cell D is "RootCellFolder/CellAFolder/CellCfolder/Cell-DAttributeFile." Thus, even when two cells with corresponding attribute files in different folders have the same name, the two cells may be distinguished by the pathnames to the attribute file in the file system hierarchy. Thus, the namespace is unique and automatically defined. If different instances of the pseudo-world are executing on different computer systems, the computer system name may be pre-pended to the pathname, (e.g., <IP address of computer system>/<pathname to the cell>).

The unique identifiers may be used, for example, when an avatar teleports to a location. Specifically, the avatar, under the control of a user, may teleport by merely identifying the pathname to the attribute file. Because the parent-child relationships are apparent in the pseudo-world in accordance with one or more embodiments of the invention, the user may be able to easily identify the pathname.

FIGS. 4-7 show flowcharts in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. In addition, steps such as store acknowledgements have been omitted to simplify the presentation.

Figure 4:
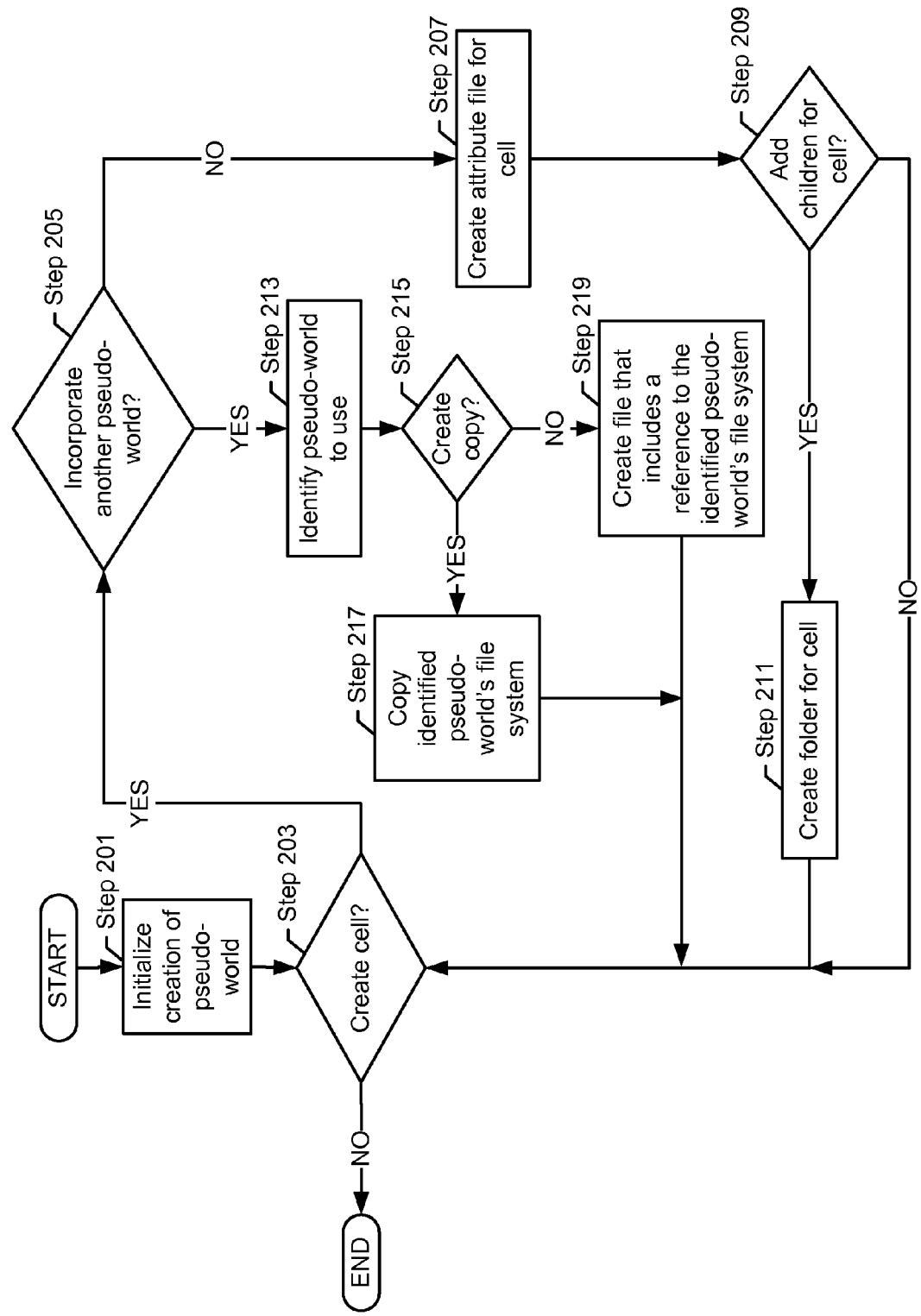
FIGS. 4-7 show flowcharts in accordance with one or more embodiments of the invention.

FIG. 4 shows a flowchart of a method for a developer or the toolkit to create a pseudo-world file system in accordance with one or more embodiments of the invention. In one or more embodiments of the invention, a developer may design the pseudo-world using a program, such as a graphing program. The toolkit may create the pseudo-world file system based on the developers design. Alternatively, the developer may create the pseudo-world file system directly.

In Step 201, creation of the pseudo-world is initiated. In one or more embodiments of the invention, a developer may start creating the pseudo-world by accessing the development toolkit. Thus, initiating the creation of the pseudo-world may include starting the development toolkit. In one or more embodiments of the invention, creating a pseudo-world may be initiated and performed using standard operating system file system manipulation tools. For example, a developer may use operating system commands to create a file or folder, open the file or folder, edit the data in the file (e.g., by using a text editor or other editor), and close the file or folder.

In Step 203, a determination is made whether to create a cell. In one or more embodiments of the invention, the first cell that is created is the cell representing the pseudo-world. Once the initial cell (i.e., the cell defining the existence of the pseudo-world) is created, the cells may be created at any time throughout the life of the pseudo-world. For example, the developer may create a basic pseudo-world and then access the pseudo-world with an avatar. After accessing the pseudo-world, the developer may decide that additional cells are desired. Accordingly, the developer may create additional cells. The creation of the pseudo-world may even include collaboration amongst multiple developers. Specifically, multiple developers may create cells for the pseudo-world.

If the determination is made to create a cell, then a determination is made whether to incorporate another pseudo-world in the pseudo world (Step 205). In one or more embodiments of the invention, a cell or a set of cells may be based on one or more cells in a previously existing pseudo-world. For example, the creation of a new pseudo-world may start with a previously existing pseudo-world.

If a determination is made not to incorporate a pseudo-world, then an attribute file for the cell is created (Step 207). The developer may create the attribute file from scratch or by using a template. For example, the developer may use the toolkit to create the cell, such as by dragging and dropping one or more pre-defined cells into a space representing the pseudo-world.

In one or more embodiments of the invention, the attribute file allows a developer to customize cells. For example, the developer may define functionality of the cell in programming language code, define the appearance of the cell in a graphics file, and then create the attribute file for the cell to reference both the code and the graphics file. Further, the developer may set the position of the cell in the attribute file, and add other attributes of the cell to the attribute file or add references to the attributes in the attribute file. The attribute file is stored in the folder corresponding to the parent cell of the cell being created. Specifically, a determination is made as to which cell in the pseudo-world file system should be the parent of the cell. As discussed above, determining which cell is the parent cell may be based on the type of cell and the function of the cell. The cell is then stored in the folder corresponding to the parent cell.

Further, a determination is made whether to add one or more child cells for the cell (Step 209). Specifically, a determination is made whether the cell has child cells. If a determination is made to add one or more child cells, then a folder is created for the cell in accordance with one or more embodiments of the invention (Step 211). A new folder is created for the cell in the pseudo-world file system.

Returning to Step 205, if a determination is made to incorporate another pseudo-world, then the pseudo-world to incorporate is identified (Step 213). Specifically, the file system location of the previously existing pseudo-world file system to incorporate is identified. The pseudo-world may be on a remote file system or on the same file system as the pseudo-world file system.

In Step 215, a determination is made whether to create a copy of the pseudo world to incorporate. If a determination is made to create a copy, then the identified pseudo-world's file system or a portion thereof is copied into the new pseudo-world file system (Step 217). Specifically, a copy command is performed to copy the previously existing pseudo-world file system or a portion thereof onto the new pseudo-world file system. Similar to the attribute file created in Step 207, the copied attribute file is stored in the folder corresponding to the parent cell in the pseudo-world file system.

Similarly, although not shown in FIG. 4, a developer may also copy an attribute file in the same pseudo-world file system. For example, if the developer is creating multiple identical houses, the developer may create a single attribute file for the house and then create multiple copies in the pseudo-world.

When copying an attribute file, attributes may be updated for the new cell. For example, when the attribute file is updated for the new pseudo-world, the attribute file may be updated to be positioned based on the origin of the parent. Similarly, the attribute file may be updated to rescale the cell to fit within the boundaries of the parent. Other attributes of the cell may be similarly updated.

Alternatively, a file is created in the new pseudo-world file system that includes a reference to the pseudo-world file system to incorporate (Step 219). Specifically, an attribute file that is a reference file is created. The reference file may also include the position in the new pseudo-world, changes from the incorporated pseudo-world, and other such attributes for the cell in the new pseudo-world. The reference file may also include parameters for accessing the previously existing pseudo-world, such as connection setting required, authentication information, and other such pertinent information for accessing the computer system on which the previously existing pseudo-world file system is located. Similar to the attribute file created in Step 207, the reference file is stored in the folder corresponding to the parent cell in the pseudo-world file system.

As shown in FIG. 4, Steps 203-219 may repeat to create all of the cells of the pseudo-world file system. Specifically, the cells of the pseudo-world may continually be created.

Figure 5:
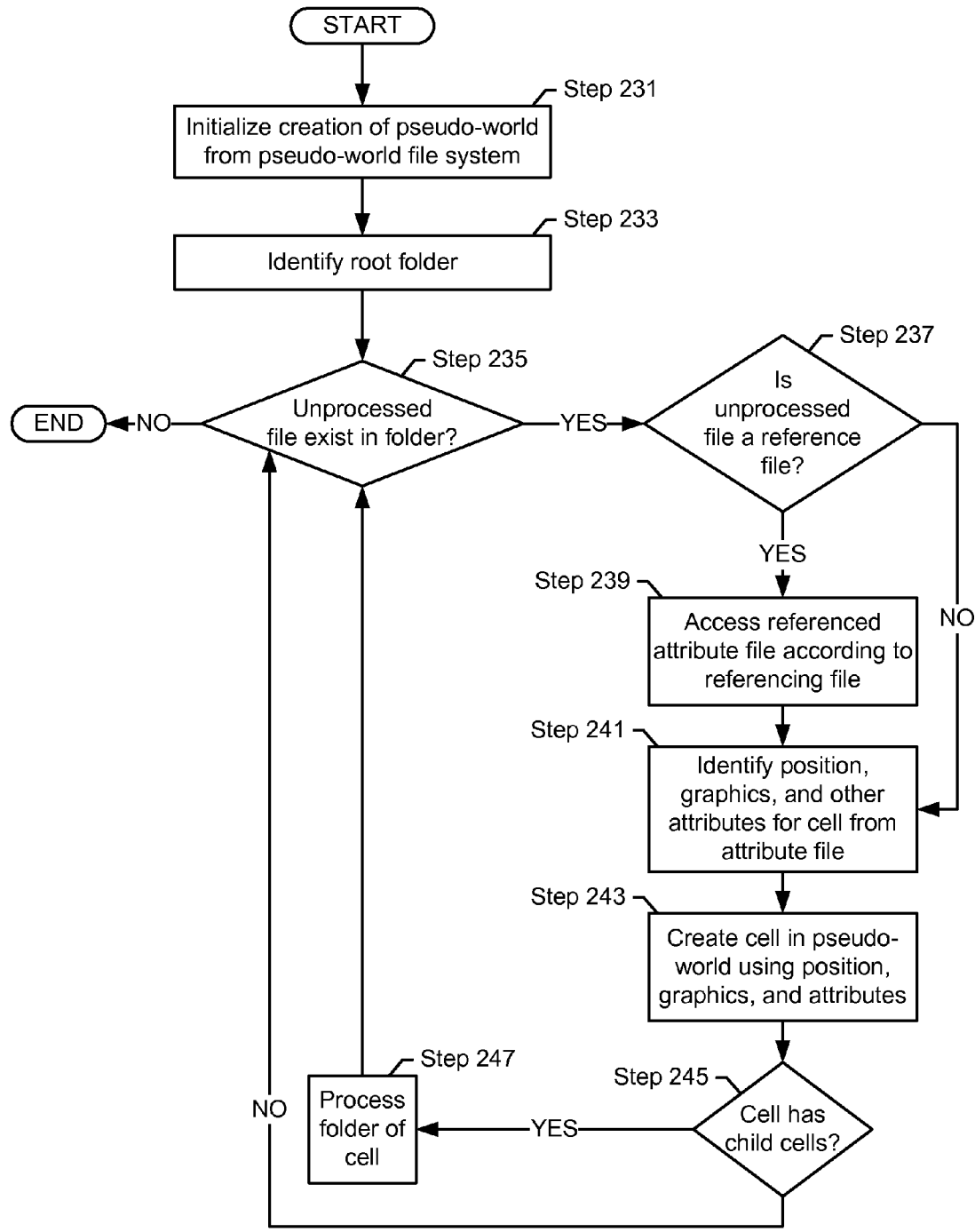

FIG. 5 shows a flowchart for creating a pseudo-world from a pseudo-world file system in accordance with one or more embodiments of the invention. Specifically, FIG. 5 shows a flowchart for the pseudo-world application to generate the pseudo-world from the pseudo-world file system.

In Step 231, the creation of the pseudo-world from the pseudo-world file system is initialized. In one or more embodiments of the invention, the initialization of the pseudo-world is generated by initiating execution of the pseudo-world application.

In Step 233, a root folder is identified (Step 233). As discussed above, the root folder defines a cell that provides the basis of the pseudo-world. Specifically, all cells in the pseudo-world are in the root folder in accordance with one or more embodiments of the invention.

In Step 235, a determination is made whether an unprocessed file exists in the folder. Initially, when the root folder is initially accessed, at least one unprocessed attribute file is in the folder in accordance with one or more embodiments of the invention. In one or more embodiments of the invention, only attribute files that are recognized are processed. Specifically, if an attribute file does not comply with the naming convention, then the attribute file is not processed. By only processing attribute files that comply with the naming convention, embodiments of the invention allow for cells to be temporarily hidden in the pseudo-world.

In Step 237, if an unprocessed file exists in the folder, then a determination is made whether the unprocessed file is a reference file. If the unprocessed file is a referenced file, then the referenced attribute file is accessed according to the referencing file (Step 239). Accessing the referenced attribute file may involve authentication with a remote computer system having the referenced file. Further, in one or more embodiments of the invention, any folder that corresponds to the cell that is defined by the referenced attribute file is also accessed. Specifically, when a cell corresponding to a referenced attribute file is incorporated in the pseudo-world, child cells of the cell are also incorporated into the pseudo-world. For example, if pseudo-world x has a building that is referenced by pseudo-world y file system, then all child cells of the building are also incorporated into the pseudo-world y when the building is incorporated into pseudo-world y.

In one or more embodiments of the invention, regardless of whether the unprocessed file is a reference file, the position, graphics, and other attributes of the cell are identified for the cell from the attribute file (Step 241). Specifically, the attribute file is accessed. Any references in the attribute file to a graphic file and other files or portions of files are also accessed. The cell is created in the pseudo-world using the position, graphics, and other necessary attributes of the cell (Step 243). Specifically, the cell is added to the pseudo-world in the position specified by the attribute file.

In one or more embodiments of the invention, a determination is made whether the cell has children (Step 245). In one or more embodiments of the invention, determining whether a cell has children may be performed by determining whether a folder exists for the cell. In one or more embodiments of the invention, the folder and the attribute file have a unique identifier that associates the folder with the cell. For example, at least a portion of the name of the folder and the attribute file may be the same unique name. As an example, at least a portion of the folder and the attribute file for a building may be "Building324". In the example, "Building324" of the folder and attribute file may be the only "Building324" in the parent folder.

If the cell has children, then the folder of the cell is processed (Step 247). Specifically, each attribute file and folder in the cell is processed. Processing the folder by repeating Steps 235-247 for each attribute file in the folder.

Figure 6:
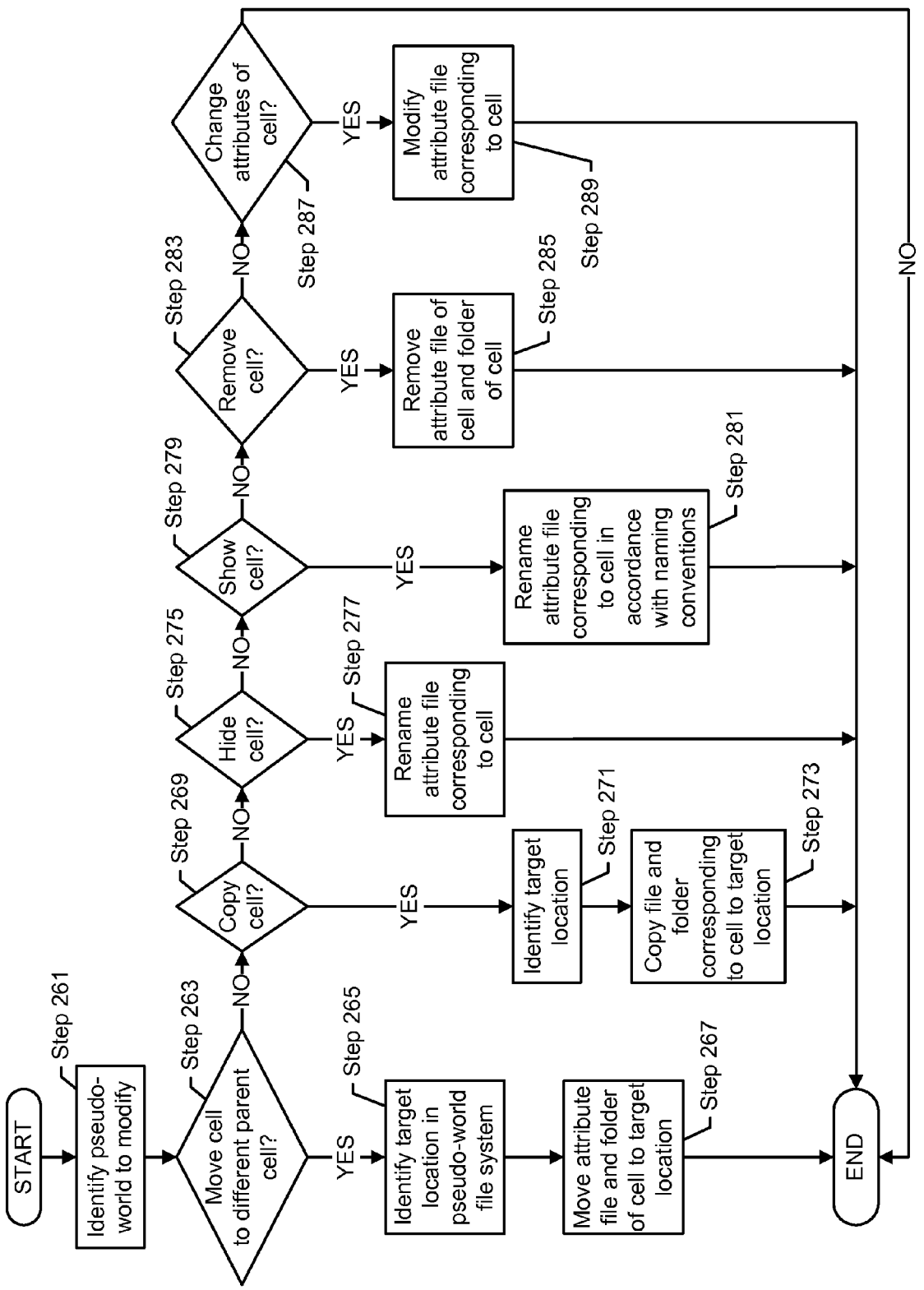

FIG. 6 shows a flowchart to modify the pseudo-world in accordance with one or more embodiments of the invention. In Step 261, the pseudo-world to modify is identified. Further, the pseudo-world file system for the pseudo-world is identified.

In Step 263, a determination is made whether to move the cell in the pseudo-world to a different parent cell. If the determination is made to move the cell to a different parent cell, then the target location in the pseudo-world file system is identified (Step 265). Specifically, the folder corresponding to the new parent cell is identified. If a folder does not exist, then the folder is created. In one or more embodiments of the invention, the folder is created in the same folder as the attribute file corresponding to the parent cell.

Once the target location is identified, the attribute file and the folder of the cell to move are moved to the target location (Step 267). In one or more embodiments of the invention, when a cell is moved, all child cells are also moved to the new location. Thus, moving the attribute file and folder may be performed using a simple file system move command in accordance with one or more embodiments of the invention. At this stage, a determination may be made whether the previous parent of the moved cell has a child cell. Specifically, a determination may be made whether the moved child cell was the only child of the previous parent cell. If the moved child cell is the only child cell of the previous parent cell, then the folder corresponding to the previous parent cell may also be removed.

Although not shown in FIG. 6, a determination may be made to move all child cells of a parent cell. In such a scenario, the move command may be applied to all attribute files and folders in the folder corresponding to the parent cell.

Further, in such a scenario, the folder corresponding to the parent cell may be removed once all attribute files and folder in the folder are moved.

In Step 269, a determination is made whether to copy a cell. If a determination is made to copy a cell, then the target location for the cell is identified (Step 271). The folder corresponding to the new parent cell is identified. If a folder does not exist, then the folder is created. In one or more embodiments of the invention, the folder is created in the same folder as the attribute file corresponding to the parent cell. Once the target location is identified, the attribute file and the folder of the cell to copy are copied to the target location (Step 273). In one or more embodiments of the invention, when a cell is copied, all child cells are also copied to the new location. Thus, copying the attribute file and folder may be performed using a simple file system copy command in accordance with one or more embodiments of the invention.

Further, although not shown in FIG. 6, a determination may be made to copy all child cells of a parent cell. In such a scenario, the copy command may be applied to all attribute files and folders in the folder corresponding to the parent cell.

In Step 275, a determination is made whether to hide a cell. In one or more embodiments of the invention, if a determination is made to hide a cell, then the attribute file corresponding to the cell is renamed (Step 277). Specifically, the attribute file may be renamed so that the name of the attribute file no longer complies with the naming conventions of an attribute file. For example, if the naming conventions require that the name of the attribute file ends in "-af", then the name of the attribute file may be modified so that it no longer ends in "-af". In alternative embodiments of the invention in which naming conventions are not used, then hiding a cell may include moving the cell from the pseudo-world file system to a different file system.

In one or more embodiments of the invention, when the attribute file is renamed so that the cell is hidden, the child cells of the cell are also hidden. Specifically, the folder corresponding to the cell is not accessed when the attribute file is renamed. Alternatively, the folder may also be renamed to hide the child cells so that the folder does not comply with naming conventions.

In Step 279, a determination is made whether to show a hidden cell. If a determination is made to show a hidden cell, then the attribute file corresponding to the cell is renamed so as to comply with the naming conventions (Step 281). Renaming the folder may be performed as discussed above. Showing a hidden cell by renaming an attribute file may result in the child cells of the hidden cell to also be shown in accordance with one or more embodiments of the invention.

In Step 283, a determination is made whether to remove a cell. If a determination is made to remove a cell, then the attribute file of the cell and the folder of the cell is removed (Step 285). Removing an attribute file and folder may be performed using a file system remove or delete command. Because the folder is also removed, the removal of a cell causes the removal of child cells of the removed cell in accordance with one or more embodiments of the invention.

In Step 287, a determination is made whether to change the attributes of the cell. The attributes may be changed by modifying the attribute file corresponding to the cell (Step 289). Changing the attributes of the cell may involve changing the position of the cell in the parent cell, changing the access permissions of the cell, changing the graphics of the cell, changing the functionality of the cell, and performing other such actions. For example, the position of the cell may be changed by changing the attributes corresponding to the direction and distance of the cell from the origin of the parent cell. Changing the access permissions may involve changing an access control list for the cell. In one or more embodiments of the invention, when the access control list for the cell is changed, the access permissions of the child cells are also changed. Changing the access permissions may be performed to prevent an avatar to enter the cell or to view the contents of the cell. Thus, unauthorized users, through their avatars, may not view restrictive areas of the pseudo-world.

Although FIG. 6 shows only a few modifications that may be performed in the pseudo-world using the pseudo-world file system, other modifications may be performed without departing from the scope of the invention. Specifically, in one or more embodiments of the invention, commands changing the pseudo-world file system may be used to change the pseudo-world. For example, using an archiving command on the pseudo-world file system, a version of the pseudo-world may be saved for later use.

Figure 7:
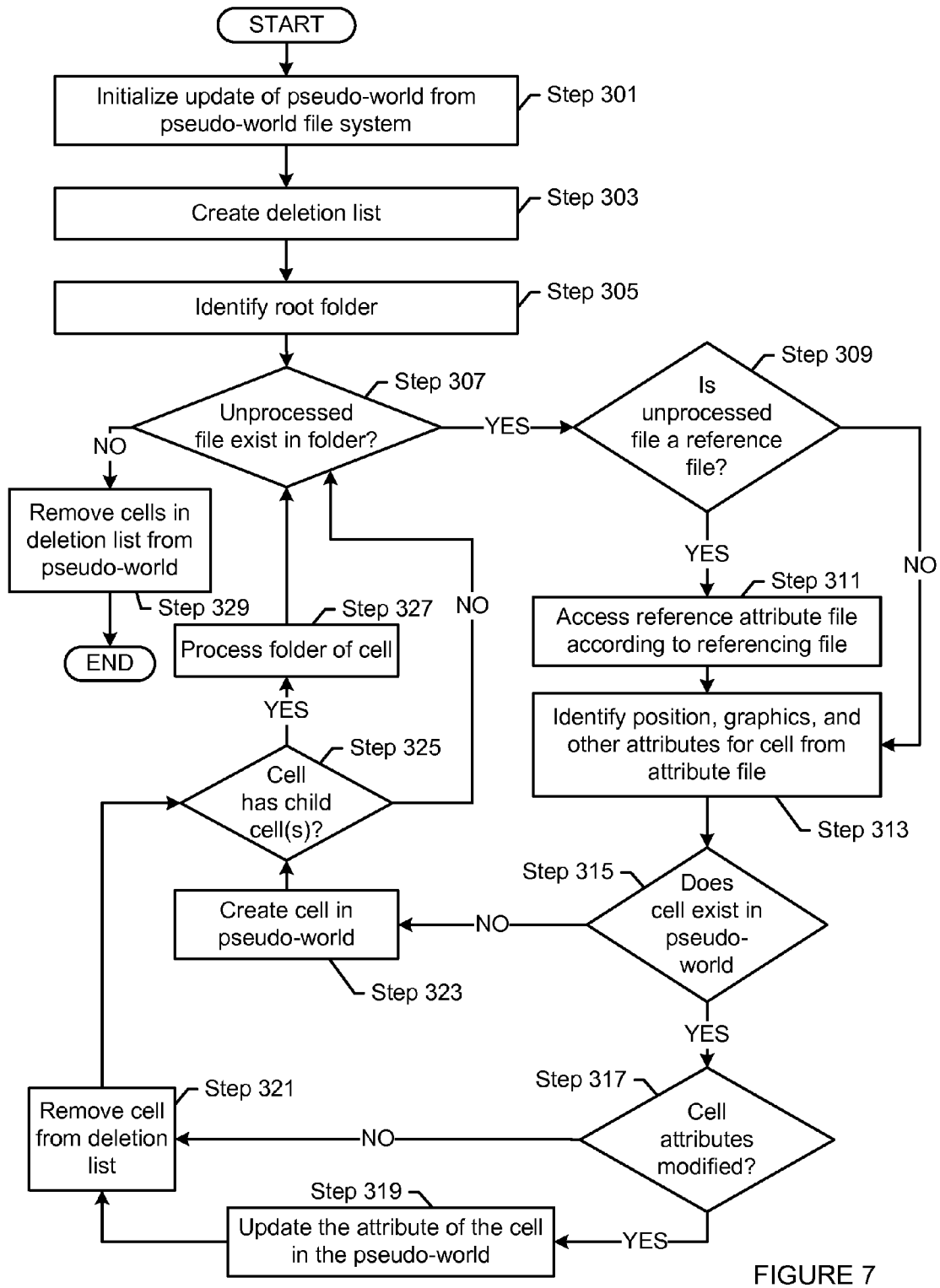

FIG. 7 shows a flowchart for reloading a portion of the pseudo-world based on modifications to the pseudo-world file system in accordance with one or more embodiments of the invention. In Step 301, the update of the pseudo-world from the pseudo-world file system is initialized. In one or more embodiments of the invention, initializing the update of the pseudo-world may be based on a command or performed automatically. For example, once a developer has made one or more changes to the pseudo-world file system, the developer may request that the pseudo-world is updated. Alternatively, the update of the pseudo-world may be performed automatically, such as on a daily basis, or when changes to the pseudo-world file system are detected.

In Step 303, the deletion list of cells is created. In one or more embodiments of the invention, the deletion list initially includes all cells in the pseudo-world. The deletion list after updating the cells in the pseudo-world includes cells that do not have recognized attribute file in the pseudo-world file system. For example, the attribute files may be hidden or removed for the cells.

In Step 305, the root folder of the pseudo-world file system is identified. In Step 307, a determination is made whether an unprocessed file exists in the folder. Determining whether an unprocessed file exists in a folder may be performed as discussed above and in Step 235 of FIG. 5.

If an unprocessed file exists in the folder, then a determination is made whether the unprocessed file is a referenced file (Step 309). If an unprocessed file is a reference file, then referenced attribute file is accessed according to the reference file (Step 311). The position, graphics, and other attributes for the cell are identified from the attribute file (Step 313). Steps 309-313 may be performed as discussed above and in Steps 237-241 of FIG. 5.

In Step 315, a determination is made whether the cell already exists in the pseudo-world. If the cell exists in the pseudo-world, then a determination is made whether the cell attributes are modified (Step 317). Determining whether the cell attributes are modified may be performed by comparing the attributes of the cell with the attributes in the attribute file of the cell. In one or more embodiments of the invention, even though the attribute file is unchanged the cell attributes may change. For example, the graphics file referenced in the attribute file may be changed. If the cell attributes are modified, then the cell is updated in the pseudo-world (Step 319). Specifically, the cell is re-rendered using the attribute file.

Regardless of whether the cell attributes are modified, the cell is removed from the deletion list (Step 321). In one or more embodiments of the invention, the cell is removed from the deletion list because the cell is in the updated pseudo-world file system.

Returning to Step 315, if the cell does not previously exist in the pseudo-world, then the cell is created in the pseudo-world (Step 323). Creating a cell in the pseudo-world may be performed as discussed above and in Step 243 of FIG. 5.

In Step 325, a determination is made whether the cell has child cells. If the cell has child cells, then the folder of the cell is processed (Step 327). Processing the folder of a cell may be performed as discussed above and in Step 247 of FIG. 5. As shown in FIG. 7, Step 307-327 may repeat until all cells in the pseudo-world file system are processed.

Once all cells are processed, then the cells remaining in the deletion list are removed from the pseudo-world (Step 329). Specifically, the attribute files of cells remaining in the deletion list are hidden or removed from the pseudo-world file system. Thus, the cells may be removed from the pseudo-world file system.

Figure 8:
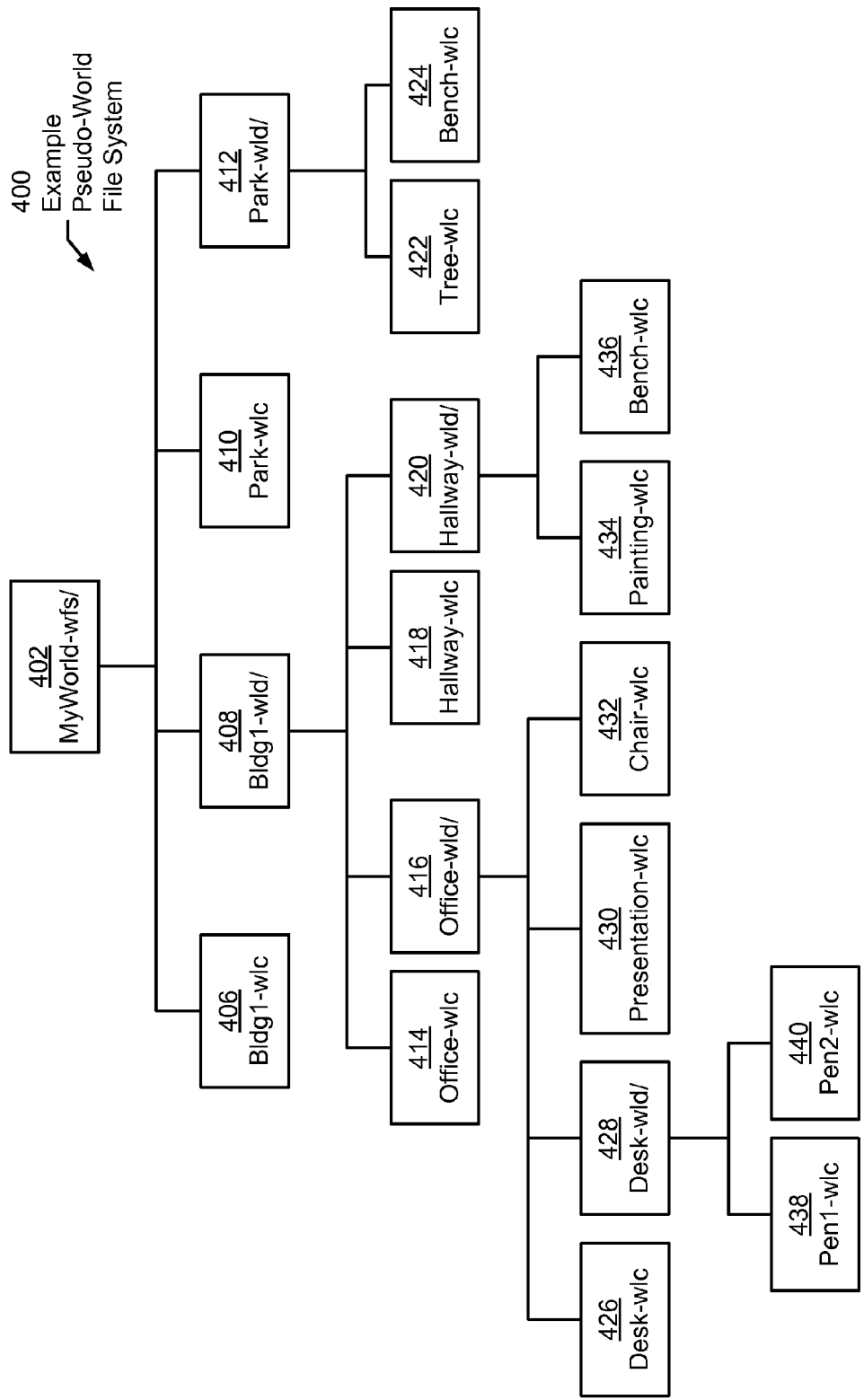
FIG. 8 shows an example file system in accordance with one or more embodiments of the invention.

FIG. 8 shows an example file system in accordance with one or more embodiments of the invention. The following example is for explanatory purposes only and not intended to limit the scope of the invention. For the following example, consider the scenario in which the naming conventions for the pseudo-world file system require that both the attribute file and the folder for a cell have the same name and different suffixes. Specifically, the suffix of the name follows the following naming convention. Attribute file has the suffix "-wlc" while a folder has the suffix "-wld".

For the following example, consider the scenario in which a developer wants to create a pseudo-world having a building and a park. To create the pseudo-world, the developer may create the example pseudo-world file system (400) shown in FIG. 8.

Specifically, as shown in FIG. 8, the root folder for the pseudo-world file system (400) is MyWorld-wfs (402). The -wfs extension indicates that the folder is a root folder of a pseudo-world in accordance with one or more embodiments of the invention. Since the pseudo-world is to have a building and a park, the developer creates attribute files for the building and for the park in the MyWorld-wfs folder (402). The attribute file for the building is Bldg1-wlc (406). The attribute file for the park is Park-wlc (410). The Bldg1-wlc defines the location of the building with respect to the origin of the parent cell (i.e., MyWorld), the appearance of the building, and any other information about the building. Similarly, when creating the Park-wlc (410) file, the developer adds the location with to the origin of the parent cell (i.e., MyWorld), the appearance, and other information.

The developer may also decide that certain features of the park should be part of the park cell. For example, the graphics file for the park cell includes graphics for a walkway, a fountain, and other information. While creating the park, the developer may decide that at least one tree in the park should be a separate cell from the park and a bench in the park should be a separate cell. For example, the developer may determine that the tree should have additional functionality (e.g., sway in a virtual breeze, grow, show flowers when a virtual sun shines, and perform other functions of a virtual tree). Further, the developer may decide that a bench in the park should be a separate cell to allow the developer to reuse the bench. Accordingly, the developer defines a separate Tree-wlc (422) attribute file and a Bench-wlc (424) attribute file. Since the tree and the bench are in the park, the developer stores the Tree-wlc (422) attribute file and the Bench-wlc (424) attribute file in the Park-wld (412) folder.

Returning to the building, the developer may decide that the building should include an office and a hallway. Thus, the developer defines an Office-wlc (414) attribute file and a Hallway-wlc (418) attribute file. The Office-wlc (414) attribute defines the position of the office with respect to the origin of the building. The Office-wlc (414) attribute file may also reference a graphic file with the appearance of the office.

The office in the example pseudo-world includes a desk, a presentation, and a chair. Accordingly, a folder associated with the office includes a Desk-wlc attribute file (426), a Presentation-wlc (430) attribute file, and a Chair-wlc (432) attribute file. The Desk-wlc (426) attribute file, the Presentation-wlc (430) attribute file, and the Chair-wlc (432) each define the location of the desk, presentation, and chair with respect to the origin of the office in accordance with one or more embodiments of the invention.

The desk may include two pens (e.g., pen1, pen2) in the pseudo-world. Accordingly, the developer also creates a Pen1-wlc (438) attribute file and a Pen2-wlc (440) attribute file. The developer stores the Pen1-wlc (438) attribute file and the Pen2-wlc (440) attribute file in the Desk-wld (428) folder.

Returning to the building, the building may include a hallway in the example, pseudo-world. Accordingly, the developer creates a Hallway-wlc (418) attribute file that defines the appearance, position, and other attributes of the hallway. The hallway may also include a painting and a bench. Accordingly, the developer creates a Painting-wlc (434) attribute file in the Hallway-wld (420) folder. Since the developer already has defined a bench, the developer copies the Bench-wlc (424) attribute file from the Park-wld (412) folder into the Hallway-wld (420) folder to create the Bench-wlc (436) attribute file. The developer may access the Bench-wlc (436) attribute file to redefine the position of the bench with respect to the origin of the hallway.

After creating the example pseudo-world file system (400) shown in FIG. 8, the developer may manipulate the pseudo-world file system (400) to change the pseudo-world. For example, the developer may create another office in the building by creating another copy of the Office-wlc (414) attribute file and the Office-wld (416) folder in the Bldg1-wld (408) folder. When the developer creates the copy, the developer may rename the original office to "Office1" by renaming the Office-wlc (414) attribute file and the Office-wld (416) folder to Office1-wlc (414) attribute file and the Office1-wld (416) folder. The new office may be named "Office2" by changing the name of the copy of the Office-wlc (414) attribute file to Office2-wlc and the copy of the Office-wld (416) folder to Office2-wld. Also, the developer may change the position of the office2 by accessing the Office2-wlc attribute file and changing the position with respect to the parent cell, the building. When the developer changes the position of the Office2-wlc attribute file to change the position of the office2 in the pseudo-world, the desk, presentation, chair, and pens in office2 are also moved to the new position. Specifically, since the positions of the desk, presentation, chair, and pens are all defined with respect to the parent cell, changing the location of the parent cell changes the location of the child cells.

Additionally, the developer may hide a cell or the contents of the cell. For the example, consider the scenario in which the developer wants to hide the hallway. In such a scenario, the developer may change the name of the Hallway-wlc (418) attribute file from Hallway-wlc to hallway. When the Hallway-wlc attribute file is renamed, the hallway and the cells of the hallway disappear from the example pseudo-world.

Next, consider the scenario that the developer wants to only remove the cells in the hallway. In such a scenario, the developer may keep the name of the Hallway-wlc (418) attribute file as Hallway-wlc and change the name of the Hallway-wld folder to hallway. Because the folder no longer complies with the naming conventions, the folder is no longer recognized when the pseudo-world is created. Accordingly, the child cells of the hallway (e.g., the painting and the bench) disappear from the pseudo-world.

As shown by way of example above, embodiments of the invention allow for the creation and manipulation of the pseudo-world using a file system interface. For example, developers may easily create child-parent relationships among the cells by arranging files into a hierarchy of folders using the commands common to a file system interface, such as creating folders and creating files within folders. Moreover, the developer may understand the spatial hierarchy of cells in the pseudo-world by the commands common to a file system interface that list the contents (files and folders) of folders. Embodiments of the invention further allow for editing the spatial hierarchy of cells in the pseudo-world, creating copies of cells, showing/hiding cells, and removing cells using the commands (e.g., copy, rename, move, and remove) common to a file system interface.

In one or more embodiments of the invention, attributes of cells in the pseudo-world may be defined in a format understandable by humans. Further, the attributes may be edited using commands common to a file system interface, such as an edit file command.

Moreover, because the parent-child relationship in the pseudo-world file system correlates to the parent-child relationship between cells, the attributes of a cell (e.g., origin, bounds, scaling, rotation, security) may be defined relative to the parent of the cell, and may influenced by the attributes of the parent of the cell, the parents-parent of the cell, etc. Moreover, the influence of parents on the attributes automatically change when the parent-child relationship of the cell changes or if the parent-child relationship of the parent of the cell, the parents-parent of the cell, etc., changes.

Furthermore, the pseudo-world file system may be packaged and archived using standard file system packaging and archiving programs. Embodiments of the invention allow for the archived file system to be readily incorporated in the definition of pseudo-worlds on other computers, whether the file system archive is copied from the original computer to other computers, or whether other computers references the archive file stored on the original computer.

Moreover, by using a file system hierarchy, a human-understandable namespace is created to uniquely identify individual cells in the pseudo-world. For example, the namespace may be used to teleport from one location to another location in the pseudo-world. Since the namespace is inherent in a file system, the namespace may exist without additional specification by the developer. In one or more embodiments of the invention, the namespace mimics the spatial hierarchy of cells in the pseudo-world, and may be unique among all computers by including the Internet or Intranet computer and domain name in the namespace.

Figure 9:
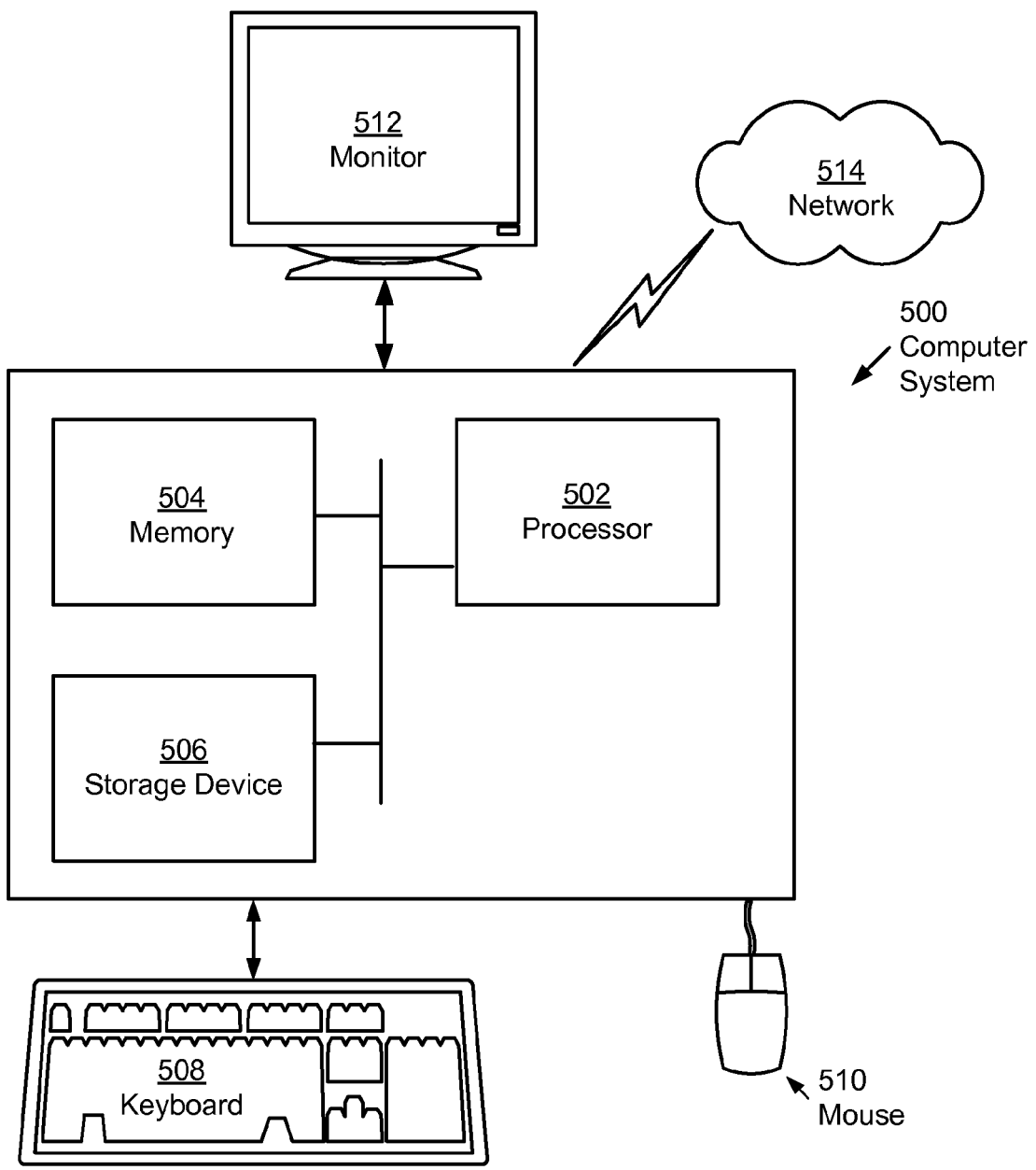
FIG. 9 shows a computer system in accordance with one or more embodiments of the invention.

Embodiments of the invention may be implemented on virtually any type of computer regardless of the platform being used. For example, as shown in FIG. 9, a computer system (500) includes one or more processor(s) (502), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., pseudo-world file system, graphic files, development toolkit, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for creating a pseudo-world comprising a plurality of cells, the method comprising:
    identifying a first pseudo-world file system,
        wherein the first pseudo-world file system comprises a plurality of folders and a plurality of attribute files arranged in a file system hierarchy,
        wherein the file system hierarchy defines a plurality of parent child relationships between the plurality of folders and the plurality of attribute files;
    processing each of the plurality of folders according to the file system hierarchy to generate the pseudo-world, wherein processing a folder of the plurality of folders comprises:
        identifying at least one child attribute file of the plurality of attribute files comprised in the folder, wherein the folder and the at least one child attribute file are in a parent child relationship of the plurality of parent child relationships based on the at least one child attribute file comprised in the folder;
        identifying a first parent cell of the plurality of cells in the pseudo-world, wherein the first parent cell is defined by a parent attribute file corresponding to the folder; and
        generating, in the pseudo-world, a child cell, of the plurality of cells, within the first parent cell for each of the at least one child attribute files based on the parent child relationship by:
            identifying a first location within the first parent cell for placement of the child cell; and
            creating, at the first location, the child cell using an attribute in the at least one child attribute file,
        wherein each cell of the plurality of cells is an object within the pseudo-world, and wherein the pseudo-world is a controlled simulation of a real world;

displaying the pseudo-world;

detecting, in the pseudo-world, an avatar moving a requested cell of the plurality of cells from the first location in the first parent cell to a second location within a second parent cell;

identifying, in the first pseudo-world file system, a folder corresponding to the second parent cell;

identifying, in the first pseudo-world file system, an attribute file corresponding to the requested cell; and moving, in the first pseudo-world file system, the attribute file corresponding to the requested cell from the folder corresponding to the first parent cell to the folder corresponding to the second parent cell in response to the avatar moving the requested cell to the second location.

2. The method of claim 1, wherein processing each of the plurality of folders further comprises:

identifying a reference file in at least one of the plurality of folders, wherein the reference file comprises a reference to a second pseudo-world file system; and creating a portion of the pseudo-world using the second pseudo-world file system based on the reference file.

3. The method of claim 1, further comprising:

moving an attribute file of the plurality of attribute files corresponding to a specific cell from a first folder of the plurality of folders to a second folder of the plurality of folders; and moving the specific cell in the pseudo-world in response to the move of the attribute file corresponding to the specific cell.

4. The method of claim 1, further comprising:

copying an attribute file of the plurality of attribute files corresponding to a specific cell from a first folder of the plurality of folders to a second folder of the plurality of folders, wherein a copy of the specific cell is created in the pseudo-world based on the copy of the attribute file corresponding to the specific cell.

5. The method of claim 1, wherein each attribute file of the plurality of attribute files complies with a naming convention.

6. The method of claim 5, further comprising:

hiding a specific cell in the pseudo-world by changing a name of an attribute file corresponding to the specific cell, wherein the name of the attribute file corresponding to the specific cell is changed to not comply with the naming convention.

7. The method of claim 1, further comprising:

generating an archive of the first pseudo-world file system to store a version of the pseudo-world.

8. The method of claim 1, further comprising:

identifying a unique cell name for a specific cell in the pseudo-world according to a path in the file system hierarchy to an attribute file corresponding to the specific cell.

9. A computer system for creating a pseudo-world, the computer system comprising:

a processor;

a physical storage device for storing a first pseudo-world file system, wherein the first pseudo-world file system comprises a plurality of folders and a plurality of attribute files arranged in a file system hierarchy, wherein the file system hierarchy defines a plurality of parent child relationships between the plurality of folders and the plurality of attribute files; and software instructions for causing the processor to perform a method, the method comprising:

processing each of the plurality of folders according to the file system hierarchy to generate the pseudo-world, wherein processing a folder of the plurality of folders comprises:

identifying at least one child attribute file of the plurality of attribute files comprised in the folder, wherein the folder and the at least one child attribute file are in a parent child relationship of the plurality of parent child relationships based on the at least one child attribute file comprised in the folder;

identifying a first parent cell of the plurality of cells in the pseudo-world, wherein the first parent cell is defined by a parent attribute file corresponding to the folder; and generating, in the pseudo-world, a child cell, of the plurality of cells, within the first parent cell for each of the at least one child attribute files based on the parent child relationship by:

identifying a first location within the first parent cell for placement of the child cell; and creating, at the first location, the child cell using an attribute in the at least one child attribute file, wherein each cell of the plurality of cells is an object within the pseudo-world, and wherein the pseudo-world is a controlled simulation of a real world;

detecting, in the pseudo-world, an avatar moving a requested cell of the plurality of cells from the first location in the first parent cell to a second location within a second parent cell;

identifying, in the first pseudo-world file system, a folder corresponding to the second parent cell;

identifying, in the first pseudo-world file system, an attribute file corresponding to the requested cell; and moving, in the first pseudo-world file system, the attribute file corresponding to the requested cell from the folder corresponding to the first parent cell to the folder corresponding to the second parent cell in response to the avatar moving the requested cell to the second location.

10. The computer system of claim 9, wherein processing each of the plurality of folders further comprises:

identifying a reference file in at least one of the plurality of folders, wherein the reference file comprises a reference to a second pseudo-world file system; and creating a portion of the pseudo-world using the second pseudo-world file system based on the reference file.

11. The computer system of claim 9, wherein the software instructions further cause the processor to:

move a specific cell in the pseudo-world in response to a move of an attribute file corresponding to the specific cell from a first folder of the plurality of folders to a second folder of the plurality of folders.

12. The computer system of claim 9, wherein the software instructions further cause the processor to:

create a copy of a specific cell in the pseudo-world based on a copy of a corresponding attribute file, wherein the corresponding attribute file is copied from a first folder of the plurality of folders to a second folder of the plurality of folders.

13. The computer system of claim 9, wherein each attribute file of the plurality of attribute files complies with a naming convention.

14. The computer system of claim 13, wherein the software instructions further cause the processor to:

hide a specific cell in the pseudo-world when a name of an attribute file corresponding to the specific cell is changed, wherein the name of the attribute file corresponding to the specific cell is changed to not comply with the naming convention.

15. The computer system of claim 9, wherein the software instructions further cause the processor to:
generate an archive of the first pseudo-world file system to store a version of the pseudo-world.

16. The computer system of claim 9, wherein a unique cell name is identified for a specific cell in the pseudo-world according to a path in the file system hierarchy to an attribute file corresponding to the specific cell.

\* \* \* \* \*